Oct. 27, 1970 R. A. HYMAN 3,536,404

AUTOMATIC DATA STORAGE AND PRINTING SYSTEM

Filed April 29, 1968 2 Sheets-Sheet 1

United States Patent Office 3,536,404
Patented Oct. 27, 1970

3,536,404

AUTOMATIC DATA STORAGE AND PRINTING SYSTEM

Robert Anthony Hyman, % English Electric Computers Limited, 24 Minerva Road, London, England Filed Apr. 29, 1968, Ser. No. 724,907
Claims priority, application Great Britain, Apr. 27, 1967, 19,550/67
Int. Cl. G03b
U.S. Cl. 355—133 3 Claims

ABSTRACT OF THE DISCLOSURE

A photographic data storage system has storage plates each bearing a plurality of blocks of data and supported in a stack. A selected plate can be transferred between the stack and a reading device for reading out stored data. To write new data in a block, the plate is taken to a writing device. A fresh plate is exposed through the plate to be changed the block to be changed being masked out by an adjustable masking device. Thus all other blocks are transferred to the new plate while the block to be changed is written on to that plate by writing device. The new plate enters the stack in place of the old plate, which is disposed of in a disposal bin. The system is buffered by a magnetic disc store and a magnetic core store.

Figure 1:
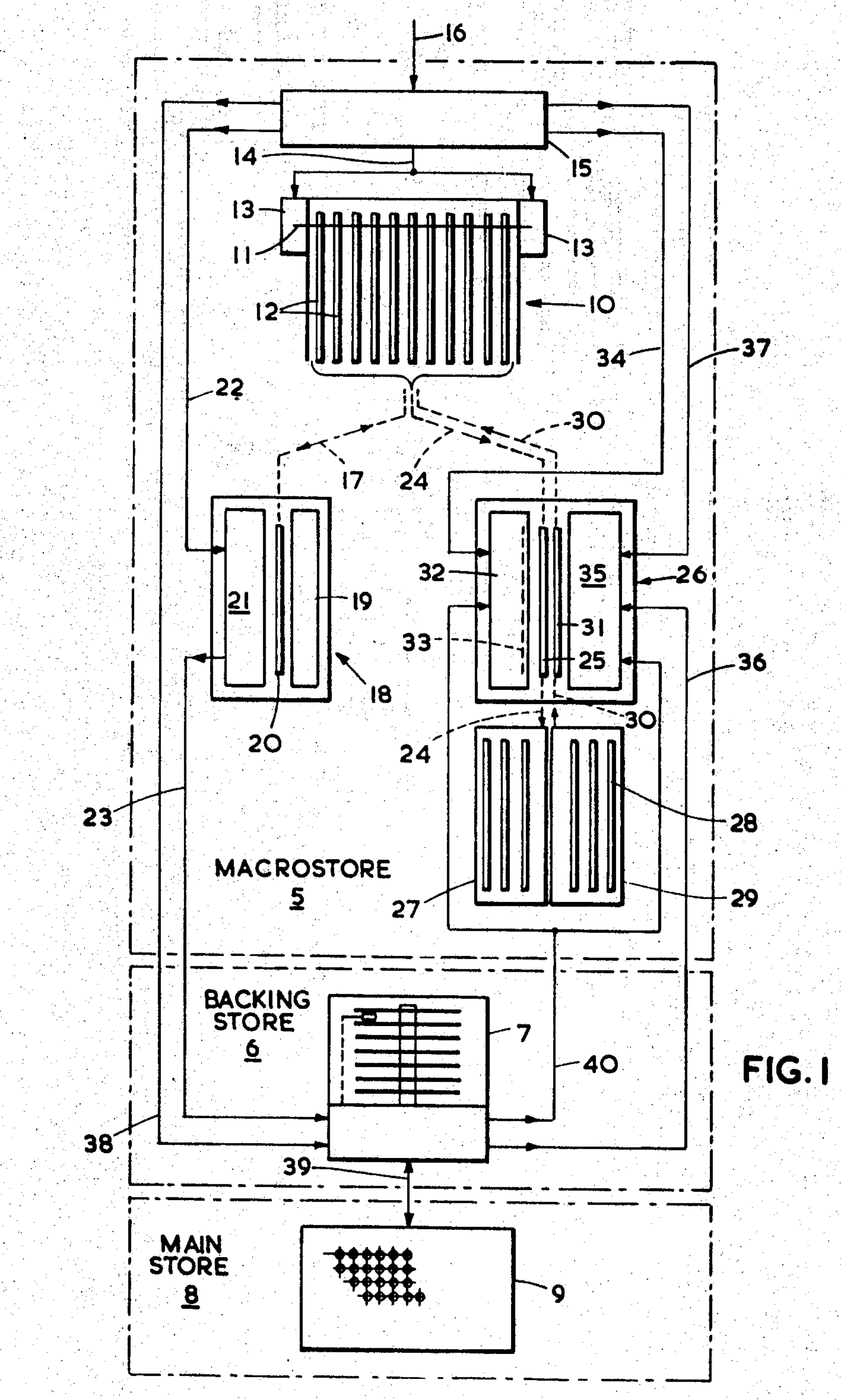

This invention relates to data storage arrangements.

In the data processing field there is a need for random access storage arrangements which are capable of storing much greater quantities of data than have been heretofore envisaged. In designing data storage arrangements there is a conflict between the desire to provide increased data storage capacity and the ability to provide at an acceptably low cost a low cycle time for sensing stored data or storing new data. In general a reduction of the read/write cycle time necessitates the use of more expensive apparatus, so that a demand for low cycle times results in increased storage apparatus cost. For large capacity storage arrangements, very low cycle times are not commercially acceptable, so that compromise has to be made between high capacity and the shortness of the cycle time.

Magnetic disc and card stores have been devised to provide high capacity, low access time, random access storage of data. However, stores of this kind depend on the provision of magnetic surfaces. Such surfaces are not only relatively expensive to produce but they have only a relatively low density of packing stored data.

Thus according to the present invention there is provided a digital data storage system in which data is stored in blocks arranged in a predetermined pattern on photographic storage elements, and wherein to change the data in selected blocks on an element, a new and unexposed element is exposed through the element containing the blocks, the blocks to be changed being effectively masked so that the data in all blocks but those to be changed is transferred to corresponding blocks on the new element, and the remaining blocks on the new element have the new data written into them, the new element then being developed and substituted for the element from which it was partially copied.

The exposure of the unexposed storage element to transfer data previously held in storage and data newly presented for storage may be carried out sequentially in either order, or they may be carried out simultaneously.

The exposure of the said part of the unexposed storage element in accordance with the said electric data signals may comprise a serial process in which individual elemental areas are exposed successively as such signals are received. Alternatively, such exposure may be effected in a "parallel" manner, i.e. simultaneously, by exposing the whole of the said part of the unexposed storage element through an intermediate photographic storage element, which has itself been prepared in a serial process as mentioned above.

If the capability of changing a plurality of blocks at the same time is required, then the transfer of data from a selected element to a new element may be achieved by a plurality of light sources individually masked to illuminate only corresponding ones of the blocks. If, alternatively, this capability is not required, so that only one block can be changed at a time, then the transfer can be achieved by a single light source with a fixed mask element, the selected element and the new element being moved together so that the block to be changed is masked by the mask element.

Data storage arrangements as envisaged by the present invention may have data storage capacities which are great by present day standards, and such high capacity storage arrangements will be termed "MACROSTORES."

One data storage system incorporating a MACROSTORE embodying the present invention will now be described by way of example and with reference to the accompanying drawings which show in FIG. 1 a schematic diagram of the arrangement of the storage system, and in FIG. 2 a representation of one photographic storage element for use in the MACROSTORE.

Referring now to the drawings the storage system includes a MACROSTORE generally indicated at 5, a BACKING STORE generally indicated at 6 and depicted as a MAGNETIC DISCSTORE 7, and a MAIN STORE generally indicated at 8 and depicted as a MAGNETIC CORE STORE 9.

The MACROSTORE includes a storage rack 10 which carries, releasably, on selection pins 11 a plurality of photographic storage elements 12 each of which comprises a flat photographic transparency in which opaque elemental areas represent binary digits (bits) stored at specific addresses.

Selection control means 13 responsive to address and control data signals supplied over line 14 from an address/control unit 15 are operative in response to such signals to select appropriate unique combinations of selection pins so as to cause the release of the desired storage element 12. The address control unit 15 receives its input data on input line 16.

Transporting means (not shown) are arranged to carry a storage element so released from the rack along path 17 to sensing or reading apparatus 18. This apparatus incorporates a light source 19 for illuminating the whole of the storage element when in the reading position shown at 20, and a reader 21 for scanning in a predetermined manner a given area only of the illuminated storage element as specified by address data supplied on line 22 by the address/control unit 15. The reader produces data output signals at line 23 whenever light from the source 19 is interrupted by an opaque elemental area of the storage element, the resultant train of output signals representing the sensed data.

The MACROSTORE also includes other transporting means (not shown) for transporting a storage element selected from the rack by the selection means in accordance with address and control data along a path 24 via a first exposure or data transfer position 25 in a data updating apparatus 26 to a discarded storage element bin 27. Further transporting means (not shown) are provided for extracting new unexposed storage elements 28 from a storage bin 29 and for transporting such elements along a path 30 via a second exposure position 31 in the updating apparatus 26 to an appropriate position in the storage rack as determined by address and control data supplied by unit 15.

The updating apparatus 26 includes a masking and exposing unit 32 on the lefthand side of the two exposure positions 25 and 31. This unit 32 incorporates a masking arrangement 33 which is situated adjacent to the exposure position 25 and which is automatically positioned in accordance with address and control data provided on line 34 by the address/control unit 15 so as to mask one or more selected areas of a storage element in the exposure position 25 against exposure by the unit 32. This unit 32 is also arranged to expose simultaneously with light all of the parts of the storage element then at the exposure position 25 which are not so masked by the masking arrangement. Thus a new, initially unexposed storage element 28 lying in the second exposure position 31 has formed therein a photographic replica of the data stored in the unmasked areas of the storage element in the first exposure position on operation of the masking and exposing means. Such a transfer of stored data provides a very high rate of data transfer for the greater part of the data stored in the original element in position 25.

The updating apparatus 26 also includes a second exposing means 35 which is mounted on the righthand side of the two exposure positions, and which incorporates a controllable radiation source (not shown) for producing a narrow beam of radiation. The radiation source is controlled in a binary manner by signals representing data to be stored and supplied thereto on line 36, whilst beam scanning means (not shown) are controlled by address and control data supplied by the address/control unit 15 on line 37. This second exposing means is thus effective in response to the signals supplied thereto to scan the radiation beam over the part or parts of the new unexposed storage element 28 which were not subjected to exposure by the masking and exposing unit 32, and by modulating the beam radiation intensity to expose or not expose elemental areas of such part or parts in accordance with the data supplied on line 36.

The BACKING STORE 6 receives address and control data from the address/control unit 15 on line 38, and stored data retrieved from a photographic storage element on line 23. The function of the magnetic disc store is to receive data from the MACROSTORE and to store it in disc tracks as specified in the address and control data supplied by the unit 15 in readiness for its subsequent transfer over channel 39 into specified addresses in the main core store. Conversely, data no longer required in the core store is transmitted over channel 39 into specified disc tracks of the disc backing store 7, and when no longer required to be retained in that store the data is transferred over line 36 to a new unexposed photographic storage element 28, being placed in addresses thereon as specified by address data supplied by the disc store 7 over line 40 and by the address/control unit 15 over line 36.

In operation, data to be used shortly in the course of operation of a data processor and which is held in storage in the MACROSTORE is addressed by the sending of address and control data on input line 16 to the address/control unit 15 of that store. Part of the address and control data stimulates the sending of corresponding address data on line 14 to the selection means 13 of the storage rack 10. In response to this address data the selection means adjusts the disposition of appropriate selection pins 11, thus causing the release of the addressed photographic storage element 12. This element is transported along path 17 to the reading apparatus 18, and in response to appropriate address data supplied to it along line 22 the reading apparatus scans a block of data identified by the address data and transmits corresponding electrical pulses on line 23 to the disc store 7 to stimulate storage of the data in disc tracks specified in address data supplied to the disc store on line 38.

This data can be transferred subsequently on demand into appropriate addresses in the main core store 9 for use in the data processor as and when required by the program.

After the transfer of data from the storage element 12 to the disc store, the storage element is transported back to its location in the storage rack 11, where it is retained until released again, by the selection means 13 in response to new address and control data supplied to input line 16. Such new address and control data may require the reading of other data stored at a different address on the same storage element, or it may require the updating of data stored therein. In the former case the storage element would be transported once more to the reading position 20, whilst in the latter case it would be transported to the said first exposure position 25.

In such latter case a new unexposed storage element 28 is extracted from the bin 29 and is transported along path 30 to the said second exposure position 31. Address data presented on line 34 by the address/control unit 15 and identifying that part of the selected storage element 12 which is to be updated cause the masking arrangement 33 to mask the part so identified, and the exposing means to illuminate the new storage element 28 through the unmasked parts of the selected storage element 12, thus transferring an image of the unmasked data to the new element 28.

Address and control data supplied simultaneously by the address/control unit 15 on line 37 to the second exposing means and on line 38 to the disc store 7 initiate the systematic scanning of the said beam of radiation over the part of the new storage element corresponding to the masked part of the said selected storage element 12, and the beam is at the same time modulated in synchronism with the scanning movement so as to store in the successive addresses data supplied by the disc store on line 40.

After fixing the photographic image now implanted in the new storage element 28, the element is transported along path 30 to take the place in the storage rack 10 of the said selected storage element 12, this latter element being transported along the path 24 to be discarded into the discarded element bin 27.

Where the data is to be extracted from and replaced in the photographic storage elements in standard blocks of predetermined size it may be desirable to provide in addition to standard size masks other masking means whereby to enable less than the standard size of block to be handled, so as to allow quicker data transfer when it may be more expedient to handle smaller block sizes.

The technique of updating stored data on a storage element by combining a simultaneous (parallel) exposure through the unmasked part of an original storage element with a serial exposure controlled by updated data signals to complete the stored data may be used to provide parts of a photographic data store for combining with other parts of that store, the complete store being obtained by later exposing a larger storage element through each of such parts simultaneously, or in succession.

Figure 2:
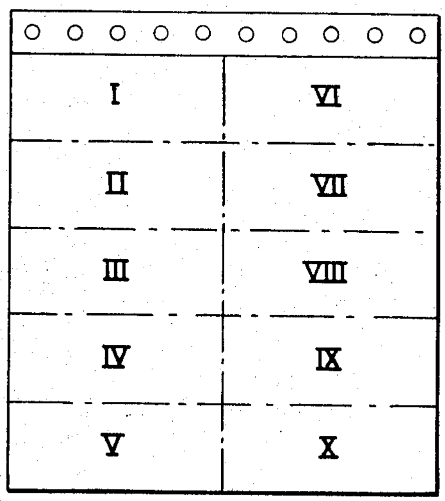

FIG. 2 illustrates one storage element having punched holes at its upper boundary for engaging with the pins 11 of the rack 10. The element is sub-divided for data reading and writing purposes into ten blocks I to X of standard size, and each block holds a photographic image of $10^8$ bits. The photographic element is approximately 10 inches by 10 inches.

It will be appreciated that the present method of updating a storage element in respect of updated data in one block only takes approximately one tenth of the time taken to update the whole element when using the serial method of transferring all of the data, since the serial transfer of only one tenth of the total data is necessary, the rest being transferred by a single "parallel" exposure.

If desired the principle of the present invention (i.e. the combination of parallel and serial exposures to effect data transfer) could be applied to the production of an updated block of data instead of to the whole contents of the storage element. In such a case a block could be so updated with part serial part simultaneous exposure of an auxiliary storage element, and this auxiliary element could then be used to give parallel exposure of that block on the final storage element, the rest of the element being completed by a parallel exposure through the unchanged parts of the original storage element.

Any suitable radiation producing means for giving the desired parallel exposure and serial controlled exposure of the new storage element may be used.

I claim:

1. Data storage apparatus including:

a plurality of photographic data storage elements, each of which has a plurality of blocks of data recorded thereon;

a magazine for supporting the storage elements and responsive to element selection signals to release a selected storage element for movement along a predetermined path;

a data recording station positioned on said path to allow the selected storage element to be positioned therein;

means for supplying an unexposed photographic element to the recording station;

first selectively operable recording means at the recording station for masking at least one of the blocks of data recorded on the storage element at the recording station and for illuminating said storage element to record all the data blocks except said masked block on the unexposed photographic element at the recording station; and second selectively operable recording means at the recording station for recording data in that part of the unexposed photographic element which was protected by said masking.

2. Data storage apparatus as claimed in claim 1 including:

a reading station for reading data from a selected storage element;

a backing store provided with means for reading, recording and erasing data, and operatively connected to the reading station to record data read therefrom and operatively connected to the second recording means to allow data read from the backing store to be recorded on said unexposed photographic element.

3. Data storage apparatus as claimed in claim 1 including an operative connection between the backing store and the first recording means to cause selective masking of the storage element at the recording station under control of stored data signals read from the backing store.

References Cited

UNITED STATES PATENTS

| | | | |
|---|---|---|---|
| 2,740,324 | 4/1956 | Cahill | 355—71 |
| 3,438,708 | 4/1969 | Thorne-Thomsen | 355—43 XR |

JOHN M. HORAN, Primary Examiner

R. L. MOSES, Assistant Examiner

U.S. Cl. X.R.

355—53, 54, 78